(12) United States Patent
Faix et al.

(10) Patent No.: US 10,260,873 B2
(45) Date of Patent: Apr. 16, 2019

(54) SURVEYING APPARATUS WITH POSITIONING DEVICE

(71) Applicant: LEICA GEOSYSTEMS AG, Heerbrugg (CH)

(72) Inventors: Oliver Faix, Diepoldsau (CH); Christoph Herbst, Dornbirn (AT); Daniel Auer, St. Gallen (CH); Josef Müller, Oberegg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 503 days.

(21) Appl. No.: 14/963,011

(22) Filed: Dec. 8, 2015

(65) Prior Publication Data

US 2016/0178365 A1 Jun. 23, 2016

(30) Foreign Application Priority Data

Dec. 17, 2014 (EP) .................................... 14198460

(51) Int. Cl.
*G01C 1/02* (2006.01)
*G01C 3/08* (2006.01)
(Continued)

(52) U.S. Cl.
CPC .................. *G01C 1/02* (2013.01); *G01C 3/08* (2013.01); *G01C 15/002* (2013.01);
(Continued)

(58) Field of Classification Search
CPC ........... G01C 1/02; G01C 3/08; G01S 7/4817; G01S 17/42; H02K 21/24; H02K 29/10
See application file for complete search history.

(56) References Cited

U.S. PATENT DOCUMENTS

| 4,922,162 A | * | 5/1990 | Shiraki | .................. | H02K 29/06 |
| | | | | | 310/156.32 |
| 5,608,281 A | * | 3/1997 | Gerling | ................ | H02K 17/165 |
| | | | | | 310/105 |

(Continued)

FOREIGN PATENT DOCUMENTS

| CN | 1580691 A | 2/2005 |
| DE | 20 2007 017856 U1 | 4/2009 |

(Continued)

OTHER PUBLICATIONS

Nasiri-Gheidari et al. "A Survey on Axial Flux Induction Motors" PrzeglĄ d Elektrotechniczny (Electrical SSN 0033-2097, R. 88 NR Feb. 2012).*

(Continued)

*Primary Examiner* — Eric L Bolda
(74) *Attorney, Agent, or Firm* — Maschoff Brennan

(57) ABSTRACT

Some embodiments of the invention include a surveying apparatus that includes an optoelectronic distance measuring device having a measuring beam path, a base for placing the surveying apparatus, a support which is mounted on the base such that it is rotatable about a vertical axis, a beam directing unit which is mounted in the support such that it is rotatable about a tilting axis, an angle measurement system for measuring the axial positions, and an actuatable positioning device driving the beam directing unit or the support. In some embodiments the positioning device may include a plurality of coils which are arranged in a positionally fixed manner in the form of a ring about the tilting axis and/or vertical axis, with winding axes which are axially parallel to the tilting axis or vertical axis.

20 Claims, 6 Drawing Sheets

(51) Int. Cl.
  *H02K 1/27* (2006.01)
  *G01C 15/00* (2006.01)
  *G01S 17/42* (2006.01)
  *G01S 7/481* (2006.01)
  *H02K 21/24* (2006.01)
  *H02K 29/10* (2006.01)
  *H02K 5/167* (2006.01)

(52) U.S. Cl.
  CPC ............ *G01S 7/4817* (2013.01); *G01S 17/42* (2013.01); *H02K 21/24* (2013.01); *H02K 29/10* (2013.01); *H02K 1/2793* (2013.01); *H02K 5/1675* (2013.01)

(56) References Cited

U.S. PATENT DOCUMENTS 6,545,381 B1    4/2003    Fehrenbacher
7,136,153 B2 *  11/2006  Mori .................... G01C 15/002
                                                             356/4.01
7,999,921 B2    8/2011    Herbst et al.
2009/0052288 A1  2/2009  Eno et al.
2009/0067461 A1 *  3/2009  Hajmousa ............ G01C 15/004
                                                              372/37

FOREIGN PATENT DOCUMENTS

| EP | 0 624 945 A1 | 11/1994 |
|---|---|---|
| EP | 1 314 960 A1 | 5/2003 |
| EP | 1 619 468 A1 | 1/2006 |
| EP | 2105706 A2 | 9/2009 |
| WO | 01/06620 A1 | 1/2001 |

OTHER PUBLICATIONS

"Brushless DC electric motor", accessed at https://web.archive.org/web/20140106110311/http://en.wikipedia.org/wiki/Brushless_DC_electric_motor, last modified on Jan. 3, 2014, pp. 6.

Supplemental European Search Report dated Jun. 26, 2015 as received in Application No. EP14198460.9.

* cited by examiner

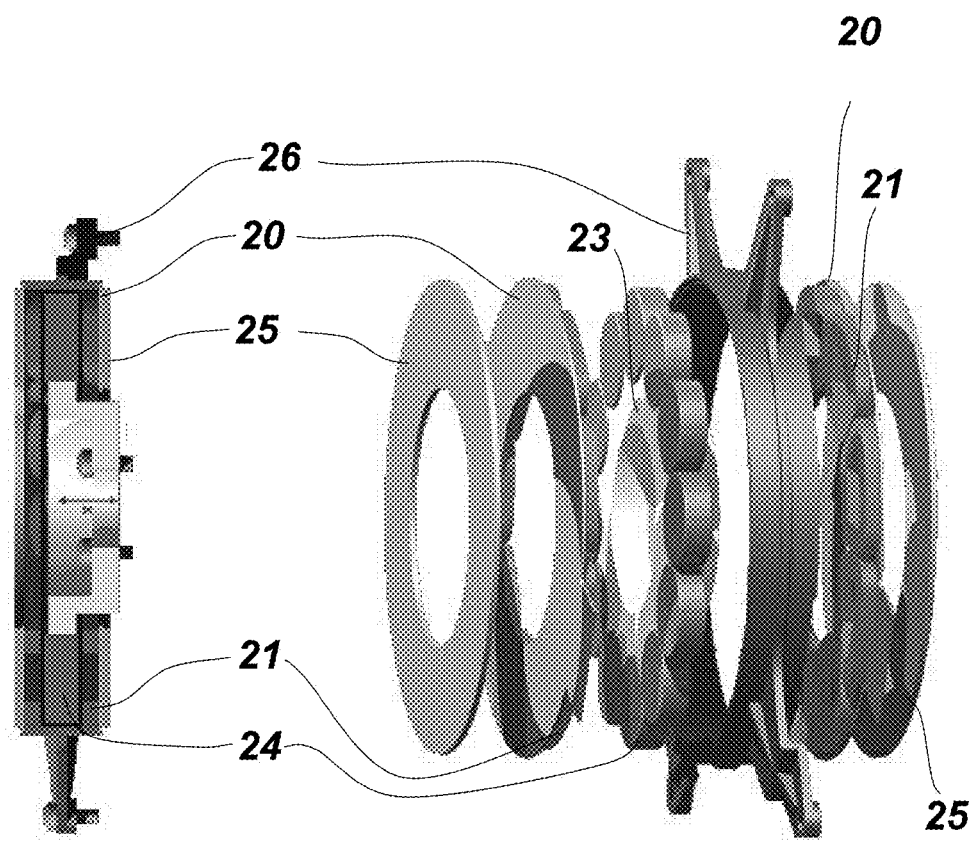

SURVEYING APPARATUS WITH POSITIONING DEVICE

FIELD OF THE INVENTION

The present invention relates to the preambles of the independent claims. The invention thus generally concerns itself with surveying apparatuses such as theodolites, scanners and trackers.

BACKGROUND

In many surveying apparatuses, the modification of oriented optical measurement radiation is required, for example, by aligning components which integrate the beam path or by focusing on a target. In this case, this modification must be performed precisely and, in the case of dynamic applications, also sufficiently rapidly, and as a result large masses to be moved are disadvantageous, for example. In addition, the suitability of the surveying apparatus for use in the field in principle requires robustness of the drive and a low power consumption.

An industrial or geodetic surveying apparatus typically has a vertical axle and a tilting axle, which are mounted and driven. Examples of such surveying apparatuses are total stations, theodolites or tachymeters, which—also together with integrated automatic target acquisition and target tracking devices—are used for multifarious surveying tasks, wherein both data acquisition and a mere examination are suitable, such as for example in structural monitoring. Other measuring apparatuses are, for example, systems such as laser trackers, laser scanners or profilers, which record topographies of surfaces as three-dimensional point clouds during the scanning method.

In solutions used to date, servomotors which represent the drive of the components are frequently used for these purposes. Servomotors with a downstream transmission are complex, expensive, require significant outlay in terms of maintenance and are susceptible to wear. Combinations of electric motors and transmissions are additionally not able to connect high axle speeds that are required for scanning with exact and slow fine-targeting or positioning, since generally the usable speed range of the motors or transmissions is not large enough herefor.

For minimum displacement distances, on the other hand, alternative drive elements can be used, such as for example electrostatic combs. U.S. Pat. No. 7,999,921 and EP 1 314 960 disclose, for example, geodetic measuring apparatuses in which piezoelements are used to move a radiation source within the housing of the measuring apparatus. However, the available movement range is limited by the deformation of the piezoelement. In particular, a continuous and unlimited movement as endless drive, as is required for example for a rotation, is not realizable by a piezoactuator or electrostatic apparatuses. Piezodrives are based on the principle of frictional engagement and are therefore prone to wear. Occasionally, noise may also be produced due to the principle. Piezodrives are moreover not suitable for high speeds. It is often advantageous for the scanning of objects if the measurement beam is moved in an oscillating fashion. This application is not continuously possible on account of wear.

Asynchronous drives may be solutions which are often used in continuous, continual, uniform movements, but cannot be used for positioning tasks in surveying instruments since the static regulation of asynchronous motors is nearly impossible.

Synchronous motors would be suitable in radial construction for surveying apparatuses, but on account of the construction, have cogging torques. With non-energized winding, the magnets of the rotor thus align with respect to the stator lamination, as a result of which the axis moves away from the predetermined position. Permanent regulation or energizing is necessary to keep such drives in position. For surveying apparatuses such as total stations, precise slow movement is necessary to be able to align the telescope with a target. This uniform movement is achievable only with difficulty owing to the cogging torque. It is often desirable to have a free internal diameter of the rotor that is as large as possible in order to use that space for guiding optical beams and/or cables through it. However, in this type of motor, the external diameter also increases strongly due to its function, as a result of which the motor can be completely oversized. In addition, owing to tolerances, synchronous motors in radial construction generate a radial, static force which is inadmissible in precision slide bearings.

SUMMARY

Some embodiments of the invention provide an improved surveying apparatus with positioning device which avoids the above-described disadvantages.

The invention is based on constructing the surveying apparatus such that use of an axial flow motor as a positioning device is possible and additional force transmission elements, such as couplings or transmissions, can be omitted. The axial flow motor is driveable using a control and evaluation unit such that the driving forces of the axial flow motor are freely configurable. Specifically, drive technologies which are known, such as voltage, frequency and/or phase difference control, can be used herefor.

The use according to the invention of axial flow motors as a positioning device permits the use as a scalable axis positioning system for moving and positioning the beam directing unit of the measuring apparatus. It is possible with respective installation of the positioning device to effect a movement about the tilting axis and about the vertical axis of the measuring apparatus to modify a beam path used for the measurement, for example by way of alignment or changing the alignment.

An axial flow motor consists of a rotor and a stator, which interact magnetically. The rotor has a plurality of permanent magnets which are fixed circumferentially to a rotor disc, and the stator has a plurality of coils which are axially opposite the permanent magnets. This correlation (rotor: permanent magnets, stator: coils) is not absolutely necessary, but technically speaking more suitable than a correspondingly reverse correlation. This is because the coils must be connected by cable to the control and evaluation unit, with which they are electrically excited such that the permanent magnets are made to rotate with the resulting electromagnetic fields of the coils.

Axial flow drives of the described type can be realized with comparatively few components and be manufactured with largely automated manufacturing technologies in a cost efficient manner. In particular, the casting of the coils into or onto the circuit board to form helical conductor tracks is a rational manufacturing method which enables a very flat construction. This likewise implies the incorporation of a discrete conductor in the printed circuit board, and printing in the multilayer method.

Since the force transmission takes place in a contactless manner, the positioning device is very low in friction and noise. As a result, the positioning device has a very high dynamic and also the ability to achieve low and high speeds. The coils are preferably configured without pregnant iron cores, which is why there is no cogging torque at any position. Rather, to increase efficiency, the coils are subject to a uniform flow deflection which thus does not allow cogging positions.

For braking operations, as they typically occur during oscillating operation of the surveying apparatus, the drive can even act as a generator and regenerate energy, which increases the mobility of the surveying apparatus in particular during battery operation.

Despite the fact that the force transmission, since it is electromagnetic, is contactless, it is possible to realize with the positioning device according to the invention a slide coupling, which is otherwise known only from components which rub against one another. In addition, with corresponding driving of the coils, a resistance moment is generated, but with twisting of stator and rotor being admitted. As a result, haptic feedback or force feedback in cases where the beam directing unit is twisted by hand is obtained. The control and evaluation unit can also regulate the coils in a closed loop such that a torque which is typical for manual operation or typical twisting at the axis is recognized and then either blocked, supported or made difficult. One criterion for allowing a twisting, if appropriate influenced in terms of force, would be the detection of a threshold moment being exceeded.

The above-described haptic behavior of the positioning device can also be obtained via a manipulative change in the bearing preloading (loading of/removal of load from the bearing) by means of the magnetic axial force which is influenceable and generated during operation of the axial flow motor.

If the positioning device has a two-sided construction, the axial force, which comes about owing to the principle from the active drive, can be set in terms of magnitude. It is thus possible to set axial-force-free behavior, for example, in a targeted fashion, but also an axial force which remains defined in order to preload, for example, a bearing.

The positioning device according to the invention can furthermore be configured for the surveying apparatus such that, when the internal diameter is selected to be large, the external diameter still remains relatively small. This advantage can be utilized to the effect that a relatively large cavity inside the positioning device can be taken into account for using other components, without the need to oversize the housing to the outside. It is also a critical advantage of the invention that the positioning device can be dimensioned to be relatively flexible in terms of its extent, in particular can be dimensioned to be very narrow.

According to a further embodiment, the axial flow motor is combinable with a ball point bearing. This combination proves particularly advantageous because the axial magnetic force of the axial flow motor, which occurs quasi as a side effect, at least partially contributes to the preloading of such a ball point bearing. A ball point bearing is distinguished here by the fact that a rotor is mounted relative to a stator by way of a ball, wherein the three participating components remain centered and stably aligned to one another, in that rotor and stator have a specially formed, centering seat for the ball. This seat is a cavity which encompasses the ball in a self-centering and stable manner. The cavity can be, for example, toric, tapered, conical, spherical, or aspherical. The ball is in this case only sunk into the respective cavity or still protrudes out of the respective cavity enough that the rotor slides on the ball and the ball slides on the stator, without rotor and stator making contact.

It is also possible to configure a surveying apparatus according to the invention such that the positioning device can be used for further ones of its axes.

BRIEF DESCRIPTION OF THE DRAWINGS

The apparatus according to the invention will be described in more detail purely illustratively below with reference to concrete exemplary embodiments that are illustrated schematically in the drawings, where further advantages of the invention will also be mentioned. Specifically:

FIG. 7: illustrates the assembly of a positioning device according to the invention in lateral section illustration;

FIG. 8: illustrates a positioning device according to the invention in exploded view.

DETAILED DESCRIPTION

Figure 1:
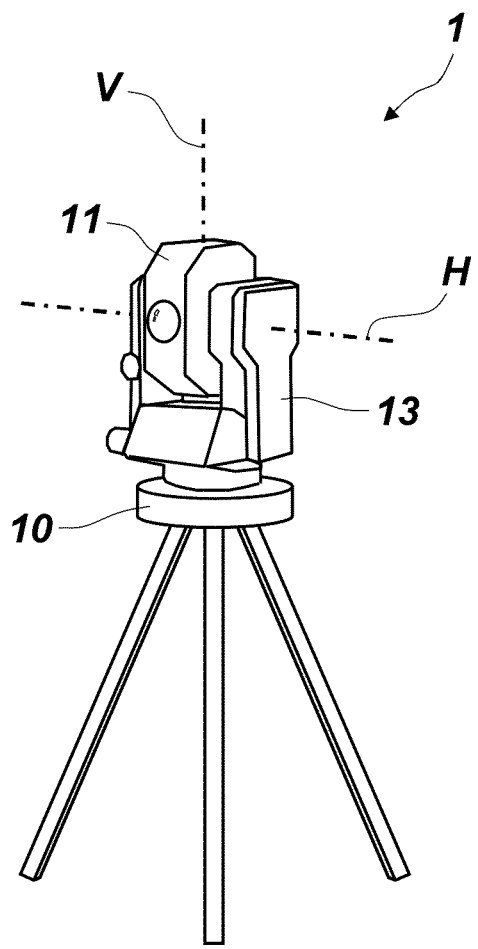
FIG. 1: illustrates a surveying apparatus according to the invention.

FIG. 1 shows an exemplary embodiment of the surveying apparatus 1 according to the invention as a theodolite. The surveying apparatus has a vertical axis V and a tilting axis H. The figure also shows the beam directing unit 11, the support 13 and the base 10 of the surveying apparatus. The positioning device according to the invention is preferably provided in the support 13, but alternatively can also be arranged in the beam directing unit 11.

Figure 2:
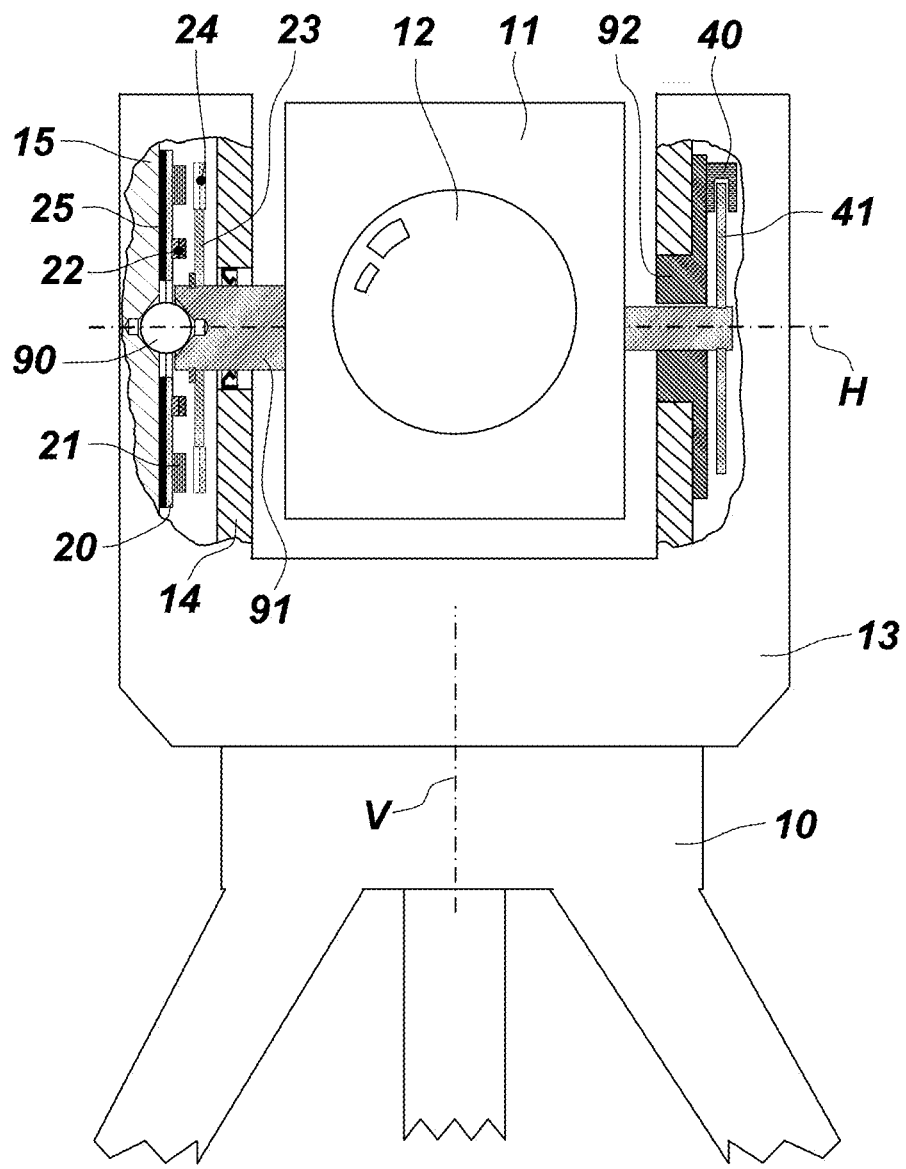
FIG. 2: illustrates a surveying apparatus according to the invention with the bearing and the positioning device in detail view.

FIG. 2 shows the theodolite in front view, wherein the relevant locations of the bearing and the drive are cut out. The beam directing unit 11 includes a telescope 12 and a distance measuring device and is connected in a rotationally fixed manner to the shaft 91. The shaft 91 has a conical hole for mounting by means of a ball 90. A further conical hole is inserted in the cover 15 of the support 13 such that the shaft 91 is mounted radially and axially in the support by way of clamping the ball 90 between the two conical holes. The preloading necessary herefor is achieved in the illustrated example primarily by way of the preloading magnets 22. The axial forces, which come about during operation of the axial flow motor (20, 21, 23, 24), can additionally also be used actively to influence the bearing forces or the bearing preloading. It is thus possible, for example, for the bearing preloading to be selectively weakened or strengthened. The circuit board 20 is connected in a fixed manner to the cover 15 or alternatively to the support 13. Coils 21, which are in each case connected by cable to the circuit board 20 via electrical conductors, are arranged in the shape of a crown on the circuit board 20. The coils 21 are wound such that their winding axis is situated axially parallel with respect to the tilting axis H. The preloading magnets 22 attract the rotor disc 23 even if the positioning device is not in operation. Rotor magnets 24 are arranged circumferentially on the outside of the rotor disc 23, which is connected in a rotationally fixed manner to the shaft 91. Said rotor magnets 24 can be, for example, standardized permanent magnets, but also custom-made components or a homogeneous remanent-magnetic ring body which was correspondingly sectionally magnetized. The magnets are likewise arranged in the form of a crown such that they are located axially opposite the coils. The poles of the rotor magnets 24 along the rotor disc circumference are alternatively "North" and "South". The control and evaluation unit, which is responsible for actuating the coils 21, can also be integrated for example in or on the circuit board 20 or be situated at a different location within the surveying apparatus.

The shaft 91 is mounted in a slide bearing fashion in a conventional V bearing 92 on the other side, wherein an encoding disc 41 is arranged on the shaft 91 in this part of the support 13, which encoding disc 41 forms, in combination with the transmitted light angle sensor 40, an angle measurement system.

The surveying apparatus 1 thus has at least an optoelectronic distance measuring device having a measuring beam path, a base 10 for placing the surveying apparatus 1, a support 13 which is mounted on the base 10 such that it is rotatable about a vertical axis V, for azimuthal alignment of the optical beam path, a beam directing unit 11 which is mounted in the support 13 such that it is rotatable about a tilting axis H, for elevation alignment of the measurement beam path, an angle measurement system for measuring the axial positions, and an actuatable positioning device driving the beam directing unit 11 or the support 13, wherein the positioning device has a plurality of coils 21 which are arranged in a positionally fixed manner in the form of a ring about the tilting axis H and/or vertical axis V, with winding axes which are axially parallel to the tilting axis H or vertical axis V, and the coils 21 are actuatable by actuating means such that they interact with a plurality of rotor magnets 24 which are adjacent circumferentially on a rotor disc 23 with alternating poles and are arranged axially with respect to the coils 21 in order to ensure the following functions:

- exerting torque on the beam directing unit 11 or the support 13,
- allowing the free-hand maneuverability of the beam directing unit 11 or the support 13, and
- blocking the maneuverability of the beam directing unit 11 or the support 13.

Free-hand maneuverability here means that the maneuverability is unlocked at least such that a user can cause typical twisting of the component with normal muscle force. Actuating means are to be understood to be, for example, closed loop control, open loop control, or evaluation units or further electronic components that relate to actuation.

The rotor magnets 24 can be embodied by standard magnets, special magnets or by a unipartite remanent magnet which is magnetized circumferentially in sectionally alternating fashion. In such a remanent magnet, which consists of homogeneous material, the magnets are integrated by way of polarization or poles.

The coils 21 are arranged on one side of the circuit board 20, in particular wherein a flow deflection element 25 is arranged on the other side of the circuit board 20, in particular is laminated onto it, or a flow deflection element 25 and the circuit board 20 are components of a composite plate, wherein the composite plate embodies a carrying structure which is fixed to the support 13 or the base 10 in a combination of the materials
- metal and
- ceramic and/or
- plastic.

Rotor and/or stator have an axially central opening. The rotor is the rotatable part of the positioning device, and the stator is the positionally fixed part of the positioning device.

The coils 21 can be embodied, instead of copper coils, also by conductor tracks which are directly embedded on the circuit board 20 or by electrical conductors directly on or in an electrically non-conducting carrier. The circuit board 20 receives further electronic components, in particular other conductor tracks, which are used for purposes other than the positioning device.

The flow deflection element 25 is configured in a uniformly planar fashion such that no cogging torques exist between stator and rotor, in particular when no electric current flows through the coils (21).

The rotor disc 23 is connected in a rotationally fixed manner to a shaft 91, and the shaft 91 is connected in a rotationally fixed manner to the beam directing unit 11 or the support 13.

Using an axial force which is achievable by way of selective actuation of the coils 21, the bearing preloading of the bearing of the shaft 91 is specifically influenceable.

The rotor disc 23 is surrounded axially on both sides by in each case a positionally fixed unit and a unit having coils that are arranged in the form of a ring, wherein the rotor magnets 24 are situated opposite the coils 21.

During braking of the positioning device, energy can be regenerated. Here, the remaining movement of the beam direction component is utilized so as to be able to operate therewith the positioning device as a generator or dynamo in a brake energy regeneration mode. This is advantageous in particular for surveying apparatuses that are operated using rechargeable batteries.

To exert torque onto the beam directing unit 11, the coils are excited via the actuation means such that the resulting rotating electromagnetic fields exert circumferential magnetic forces onto the rotor disc 23 that is provided with rotor magnets 24.

To allow the free-hand maneuverability of the beam directing unit 11 or the support 13, the coils 21 are changed into a non-excited state such that
- the interaction between the rotor magnets 24 and the coils 21 is canceled and thus the maneuverability of the rotor disc 23 with respect to the stator is free from magnetic forces, or
- the coils 21 are excited in a regulated fashion such that, when torque is detected to be exerted by hand onto the beam directing unit 11 or onto the support 13, in particular if a threshold moment is exceeded, twisting of the beam directing unit 11 or of the support in the sense of a slide coupling is permitted, wherein targeted haptic force feedback is directable counter to the twisting by way of the actuation of the coils 21.

To restrict the maneuverability of the beam directing unit 11 or of the support 13, the coils 21 are excited via the actuation means such that the resulting positionally fixed electromagnetic fields exert onto the rotor disc 23, which is equipped with rotor magnets 24, circumferential magnetic forces that block the rotation.

By way of corresponding constructive measures, the positioning device can alternatively also be arranged in the beam directing unit 11.

Figure 3:
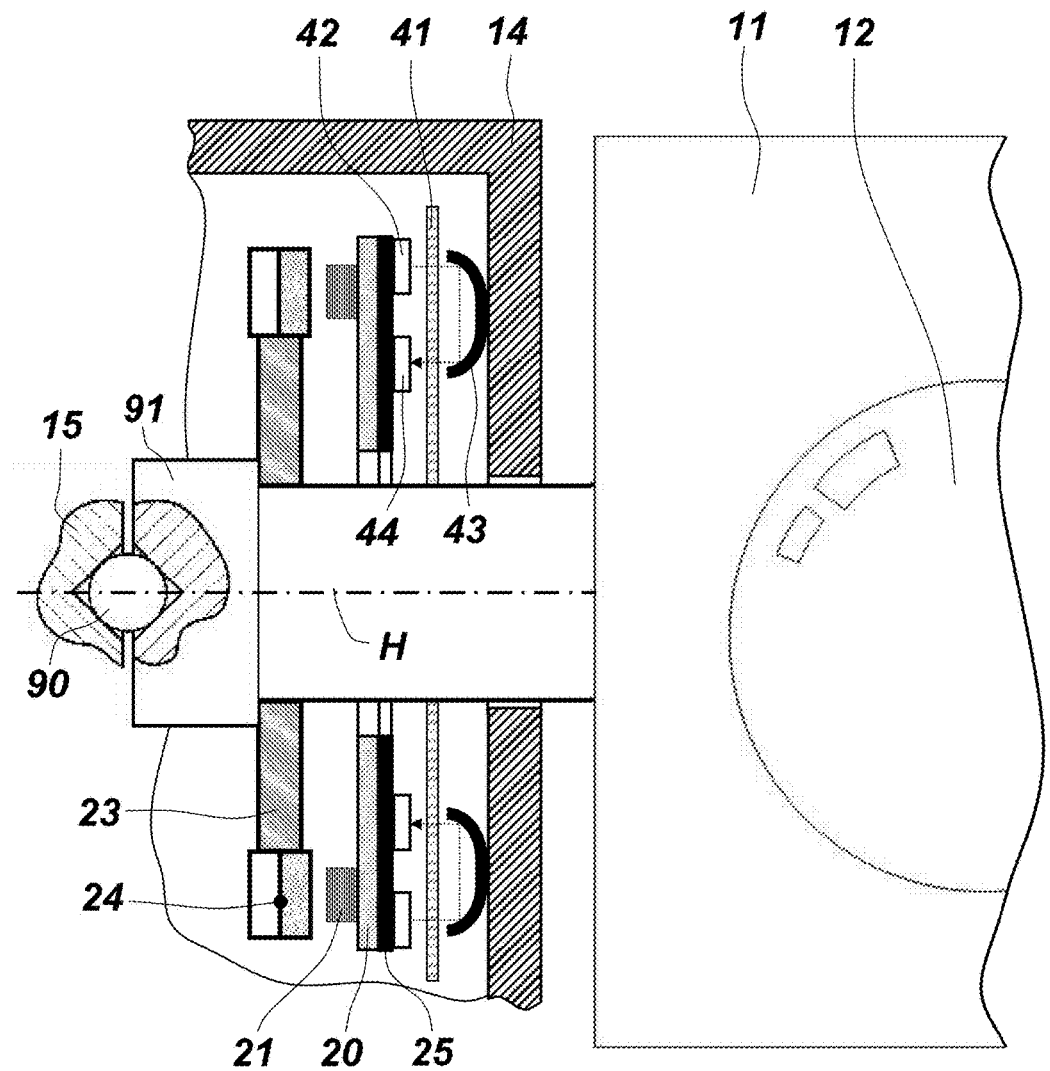
FIG. 3: illustrates, in detail view, the bearing and positioning device of a first exemplary embodiment of a surveying apparatus according to the invention.

FIG. 3 shows the enlarged detail view of a further exemplary embodiment. The rotor disc 23 is connected in a rotationally fixed manner to the shaft 91 and has rotor magnets 24 which are arranged circumferentially in the shape of a circle. A circuit board 20, which is positionally fixed in the support 13, is located opposite with the flow deflection element 25 on the backside. The flow deflection element 25 has signal transmitters 42 and signal encoders 44, which form, in combination with the reflectors 43 and the encoding disc 41, an angle measuring system.

Figure 4:
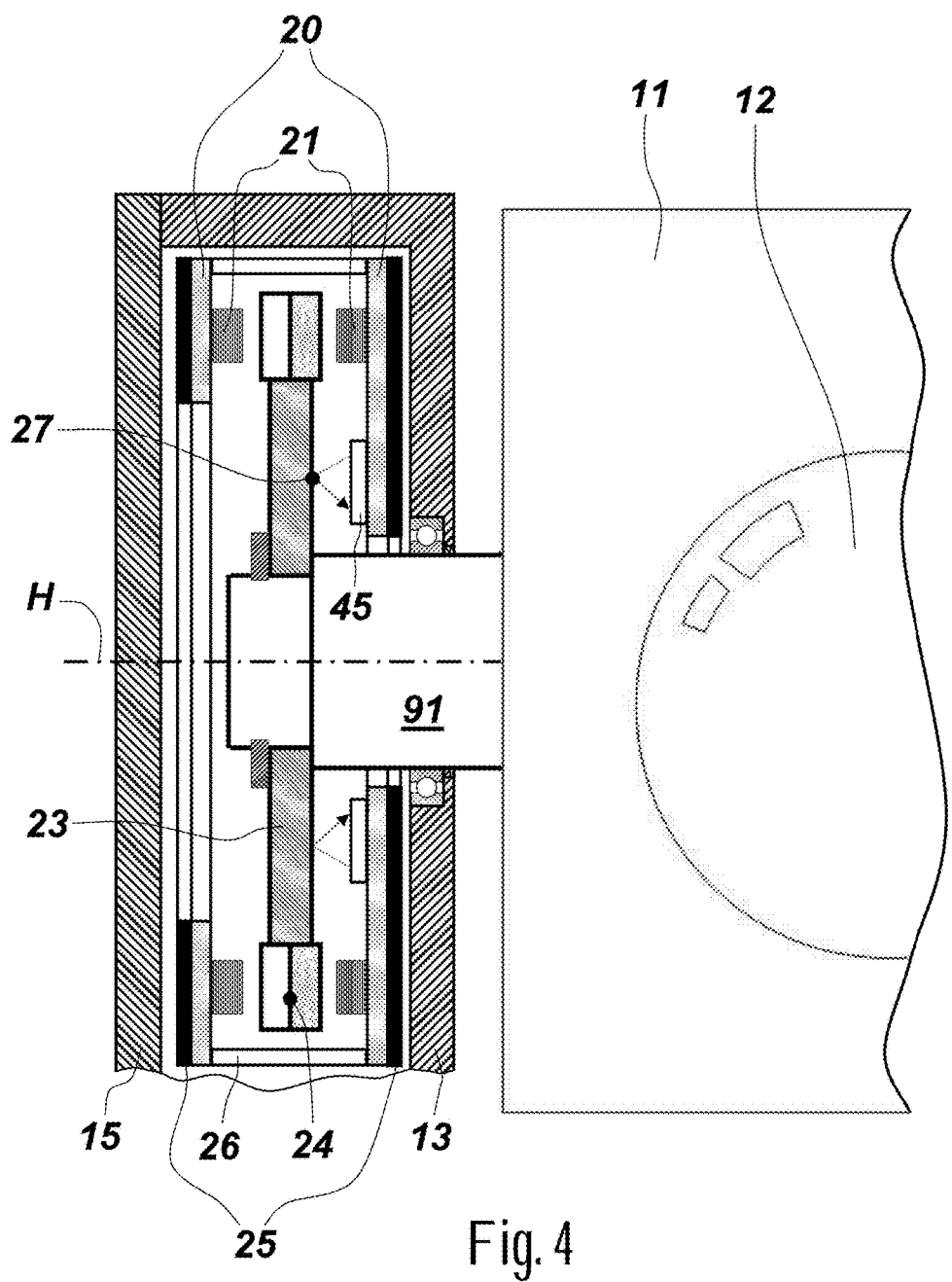
FIG. 4: illustrates, in detail view, the bearing and positioning device of a second exemplary embodiment of a surveying apparatus according to the invention.

FIG. 4 shows a two-sided construction of the axial flow motor as a positioning unit in a surveying apparatus. Due to the two-sided construction, it is possible to achieve a significantly higher torque. The circuit boards 20 that are connected to the support 13 via a carrying structure 26 have flow deflection elements 25 toward the outside and coils 21 on the inside, which are arranged in the shape of a ring about the tilting axis H. Placed between the rings of coils 11 is the rotor disc 23 with its rotor magnets 24, which are likewise arranged in the shape of a ring at the circumference. The rotor disc 23 is connected rigidly to the shaft 91 which carries the beam directing unit 11. Radial mounting of the shaft 91 in the support 13 can be done for example by way of roller bearings. The axial mounting can be done by "magnetic chucking" of the rotor in the two-sided axial flow machine. An angle measuring system is realized on the basis of coding markings 27 placed on the rotor disc 23, which coding markings are continuously scanned by a reflection angle sensor 45 arranged on one of the circuit boards 25.

Figures 5A, 5B, 5C:
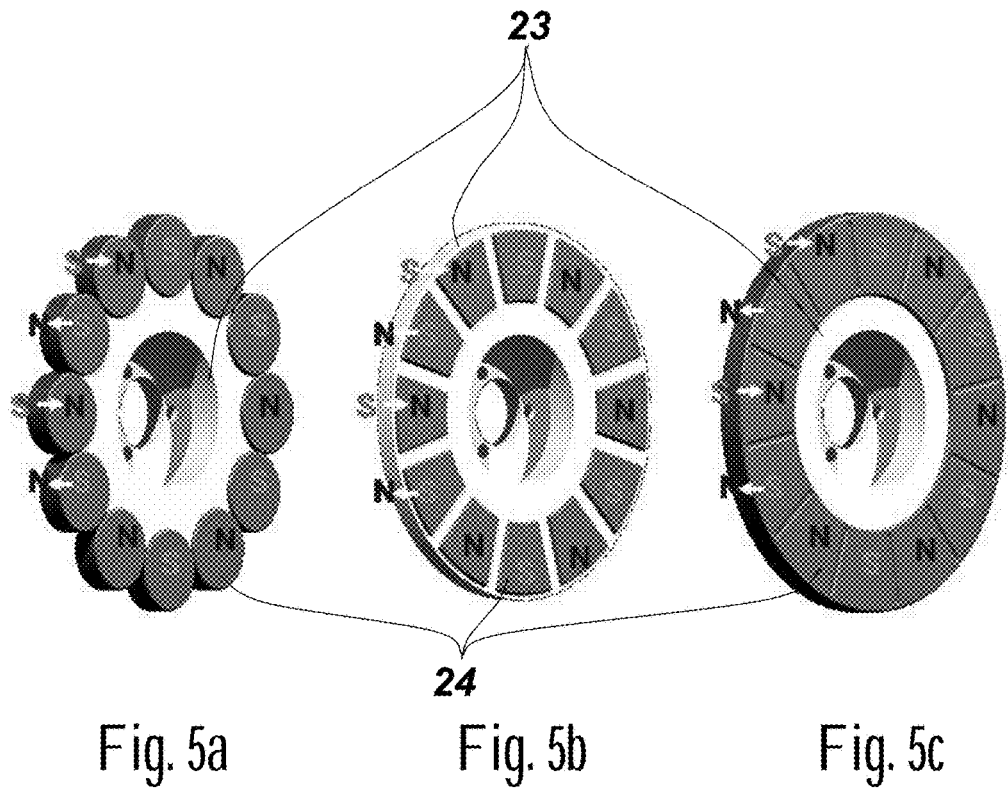
FIGS. 5a, b, c: illustrate rotors equipped with magnets.

FIGS. 5a to 5c show various variants of the rotor, specifically of the rotor disc 23 equipped with rotor magnets 24. FIG. 5a shows a rotor disc 23 with standard magnets 24 with alternating poles arranged thereon in the shape of a ring. FIG. 5b shows custom-made magnets which are integrated in the rotor disc 23, and FIG. 5c shows a unipartite remanent magnet consisting of homogeneous material, into which the magnetic pole was incorporated in a previous manufacturing step.

Figures 6A, 6B:
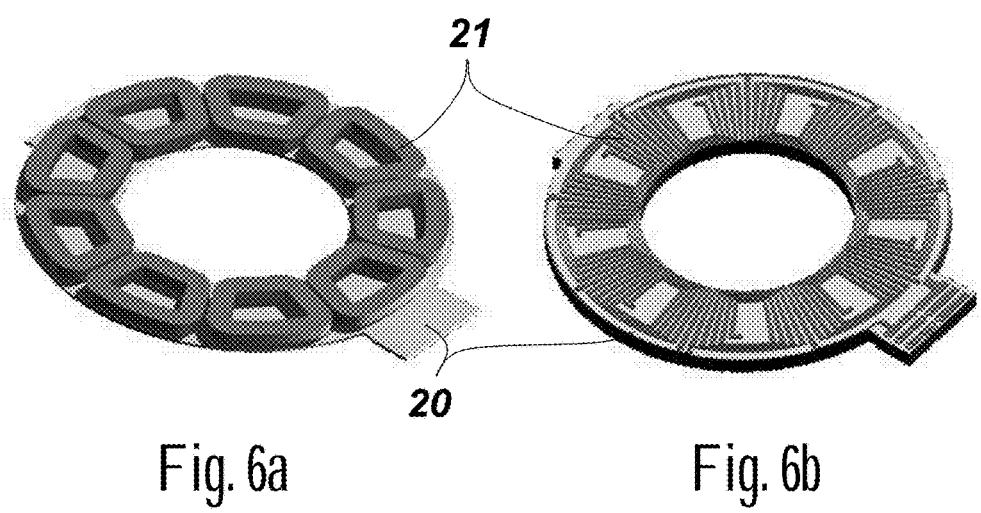
FIGS. 6a, b: illustrate circuit boards equipped with coils.

FIGS. 6a and 6b show variants of the coils 21 on the stator. FIG. 6a shows coils 21 arranged in the shape of a ring on the circuit board 20, established by the winding of copper wires, for example. The axis of the coil windings is parallel to the rotational axis (tilting axis, vertical axis) and perpendicular to the printed circuit board 20. FIG. 6b shows a circuit board 20 having integrated coils 21. These can be, for example, "printed on" or cast.

FIG. 7 illustrates an installed axial flow machine for use in a measuring apparatus according to the invention in the two-sided construction, and FIG. 8 shows the associated drawing in exploded view. The circuit boards 20 and the flow deflection elements 25 (also called shorting plates) are mounted in a carrying structure 26. The carrying structure 26 can alternatively also be realized by way of the circuit boards 20 and the flow deflection element 25 as a unitpartite component by way of correspondingly different functional layers of metal, ceramic and/or plastic being placed into composite form, in particular laminated form. This multilayer composite saves further installation space.

The circuit boards 20 carry the coils 21. The rotor disc 23, with its circumferentially arranged rotor magnets 24, is situated between the coil crowns and is freely movable there. The shaft to be positioned or the element to be driven should be attached at the inner hole or at the flange of the rotor disc 23.

It is to be appreciated that the previously shown and explained figures schematically illustrate only possible exemplary embodiments. It is particularly to be noted that the explicitly illustrated and explained examples can be used, without exception, both separately from one another and in any desired combination with one another, and are also combinable with corresponding apparatuses and methods of the prior art.

What is claimed is:

1. A surveying apparatus comprising:
  an optoelectronic distance measuring device having a measuring beam path, a base for placing the surveying apparatus,
  a support which is mounted on the base such that it is rotatable about a vertical axis, for azimuthal alignment of the optical beam path,
  a beam directing unit which is mounted in the support such that it is rotatable about a tilting axis, for elevation alignment of the measurement beam path,
  an angle measurement system for measuring the axial positions, and
  an actuatable positioning device driving the beam directing unit or the support, wherein:
    the positioning device has a plurality of coils which are arranged in a positionally fixed manner in the form of a ring about the tilting axis and/or vertical axis, with winding axes which are axially parallel to the tilting axis or vertical axis, and the coils are actuatable by actuating means such that they interact with a plurality of rotor magnets which are adjacent circumferentially on a rotor disc with alternating poles and are arranged axially with respect to the coils in order to ensure the following functions:
      exerting torque on the beam directing unit or the support,
      allowing the free-hand maneuverability of the beam directing unit or the support, and
      blocking the maneuverability of the beam directing unit or the support,
    wherein the coils are arranged on one side of a circuit board and configured such that a back iron is laminated onto the other side of the circuit board.

2. The surveying apparatus of claim 1, wherein the surveying apparatus is configured in accordance with at least one of the following:
  the rotor magnets are embodied by a unipartite remanent magnet which is magnetized circumferentially in sectionally alternating fashion;
  rotor and/or stator have an axially central opening;
  the coils are embodied by conductor tracks which are embedded on the circuit board or by electrical conductors on or in the circuit board;
  the rotor disc is connected in a rotationally fixed manner to a shaft, and the shaft is connected in a rotationally fixed manner to the beam directing unit or the support;
  the rotor disc is surrounded axially on both sides by in each case a positionally fixed unit and a unit having coils that are arranged in the form of a ring, wherein one of these units is the circuit board and wherein the rotor magnets are situated opposite the coils; or
  the positioning device is arranged in the beam directing unit, in the support or in the base.

3. The surveying apparatus of claim 1, wherein the surveying apparatus is configured in accordance with at least one of the following:
  using an axial force which is achievable by way of selective actuation of the coils, the bearing preloading of the bearing of the shaft is specifically influenceable;
  an operating mode of the positioning device is configured for energy regeneration during braking of the rotor; or
  to exert torque onto the shaft, the coils are excited via the actuation means such that the resulting rotating electromagnetic fields exert circumferential magnetic forces onto the rotor disc that is provided with rotor magnets.

4. The surveying apparatus of claim 1, wherein the surveying apparatus is configured with one of the following:
- the coils are arranged on one side of a circuit board and configured such that the back iron is arranged on the other side of the circuit board;
- the coils are arranged on one side of a circuit board and configured such that the back iron and the circuit board are components of a composite plate, wherein the composite plate embodies a carrying structure which is fixed to the support or the base in a combination of the materials metal and ceramic and/or plastic; or
- the back iron is configured in a uniformly planar fashion such that no cogging torques exist between stator and rotor when no electric current flows through the coils.

5. The surveying apparatus of claim 1, wherein the surveying apparatus is configured in accordance with one of the following:
- to allow the free-hand maneuverability of the beam directing unit or the support, the coils are changed into a non-excited state such that the interaction between the rotor magnets and the coils is canceled, and thus the maneuverability of the rotor disc with respect to the stator is free from magnetic forces;
- to allow the free-hand maneuverability of the beam directing unit or the support, the coils are excited in a regulated fashion such that, when torque is detected to be exerted by hand onto the beam directing unit or onto the support rotating of the beam directing unit or of the support is permitted, wherein targeted haptic force feedback is directable counter to the rotating by way of the actuation of the coils; or
- to restrict the maneuverability of the beam directing unit or of the support, the coils are excited via the actuation means such that the resulting positionally fixed electromagnetic fields exert onto the rotor disc, which is equipped with rotor magnets, circumferential magnetic forces that block the rotation.

6. A surveying apparatus comprising:
- an optoelectronic distance measuring device having a measuring beam path, a base for placing the surveying apparatus,
- a support which is mounted on the base such that it is rotatable about a vertical axis, for azimuthal alignment of the optical beam path,
- a beam directing unit which is mounted in the support such that it is rotatable about a tilting axis, for elevation alignment of the measurement beam path,
- an angle measurement system for measuring the axial positions, and
- an actuatable positioning device driving the beam directing unit or the support, wherein:
  - the positioning device has a plurality of coils which are arranged in a positionally fixed manner in the form of a ring about the tilting axis and/or vertical axis, with winding axes which are axially parallel to the tilting axis or vertical axis, and the coils are actuatable by actuating means such that they interact with a plurality of rotor magnets which are adjacent circumferentially on a rotor disc with alternating poles and are arranged axially with respect to the coils in order to ensure the following functions:
    - exerting torque on the beam directing unit or the support,
    - allowing the free-hand maneuverability of the beam directing unit or the support, and
    - blocking the maneuverability of the beam directing unit or the support,
  - wherein:
    - to allow the free-hand maneuverability of the beam directing unit or the support, the coils are changed into a non-excited state such that the interaction between the rotor magnets and the coils is canceled, and thus the maneuverability of the rotor disc with respect to the stator is free from magnetic forces.

7. The surveying apparatus of claim 6, wherein the surveying apparatus is configured in accordance with at least one of the following:
- the rotor magnets are embodied by a unipartite remanent magnet which is magnetized circumferentially in sectionally alternating fashion;
- rotor and/or stator have an axially central opening;
- the coils are embodied by conductor tracks which are embedded on the circuit board or by electrical conductors on or in the circuit board;
- the rotor disc is connected in a rotationally fixed manner to a shaft, and the shaft is connected in a rotationally fixed manner to the beam directing unit or the support;
- the rotor disc is surrounded axially on both sides by in each case a positionally fixed unit and a unit having coils that are arranged in the form of a ring, wherein one of these units is the circuit board and wherein the rotor magnets are situated opposite the coils; or
- the positioning device is arranged in the beam directing unit, in the support or in the base.

8. The surveying apparatus of claim 6, wherein the surveying apparatus is configured in accordance with at least one of the following:
- using an axial force which is achievable by way of selective actuation of the coils, the bearing preloading of the bearing of the shaft is specifically influenceable;
- an operating mode of the positioning device for energy regeneration during braking of the rotor; or
- to exert torque onto the shaft, the coils are excited via the actuation means such that the resulting rotating electromagnetic fields exert circumferential magnetic forces onto the rotor disc that is provided with rotor magnets.

9. The surveying apparatus of claim 6, wherein the surveying apparatus is configured with one of the following:
- the coils are arranged on one side of a circuit board and configured such that a back iron is laminated onto the other side of the circuit board;
- the coils are arranged on one side of a circuit board and configured such that a back iron is arranged on the other side of the circuit board; or
- the coils are arranged on one side of a circuit board and configured such that a back iron and the circuit board are components of a composite plate, wherein the composite plate embodies a carrying structure which is fixed to the support or the base in a combination of the materials metal and ceramic and/or plastic,
- wherein the back iron is optionally configured in a uniformly planar fashion such that no cogging torques exist between stator and rotor when no electric current flows through the coils.

10. The surveying apparatus of claim 6, wherein the surveying apparatus is configured in accordance with one of the following:
- to allow the free-hand maneuverability of the beam directing unit or the support, the coils are excited in a regulated fashion such that, when torque is detected to be exerted by hand onto the beam directing unit or onto the support rotating of the beam directing unit or of the support is permitted, wherein targeted haptic force feedback is directable counter to the rotating by way of the actuation of the coils; or to restrict the maneuverability of the beam directing unit or of the support, the coils are excited via the actuation means such that the resulting positionally fixed electromagnetic fields exert onto the rotor disc, which is equipped with rotor magnets, circumferential magnetic forces that block the rotation.

11. A surveying apparatus comprising:

an optoelectronic distance measuring device having a measuring beam path, a base for placing the surveying apparatus, a support which is mounted on the base such that it is rotatable about a vertical axis, for azimuthal alignment of the optical beam path, a beam directing unit which is mounted in the support such that it is rotatable about a tilting axis, for elevation alignment of the measurement beam path, an angle measurement system for measuring the axial positions, and an actuatable positioning device driving the beam directing unit or the support, wherein:

the positioning device has a plurality of coils which are arranged in a positionally fixed manner in the form of a ring about the tilting axis and/or vertical axis, with winding axes which are axially parallel to the tilting axis or vertical axis, and the coils are actuatable by actuating means such that they interact with a plurality of rotor magnets which are adjacent circumferentially on a rotor disc with alternating poles and are arranged axially with respect to the coils in order to ensure the following functions:

exerting torque on the beam directing unit or the support, allowing the free-hand maneuverability of the beam directing unit or the support, and blocking the maneuverability of the beam directing unit or the support, wherein:

to allow the free-hand maneuverability of the beam directing unit or the support, the coils are excited in a regulated fashion such that, when torque is detected to be exerted by hand onto the beam directing unit or onto the support rotating of the beam directing unit or of the support is permitted, wherein targeted haptic force feedback is directable counter to the rotating by way of the actuation of the coils.

12. The surveying apparatus of claim 11, wherein the surveying apparatus is configured in accordance with at least one of the following:

the rotor magnets are embodied by a unipartite remanent magnet which is magnetized circumferentially in sectionally alternating fashion;

rotor and/or stator have an axially central opening;

the coils are embodied by conductor tracks which are embedded on the circuit board or by electrical conductors on or in the circuit board;

the rotor disc is connected in a rotationally fixed manner to a shaft, and the shaft is connected in a rotationally fixed manner to the beam directing unit or the support;

the rotor disc is surrounded axially on both sides by in each case a positionally fixed unit and a unit having coils that are arranged in the form of a ring, wherein one of these units is the circuit board and wherein the rotor magnets are situated opposite the coils; or the positioning device is arranged in the beam directing unit, in the support or in the base.

13. The surveying apparatus of claim 11, wherein the surveying apparatus is configured in accordance with at least one of the following:

using an axial force which is achievable by way of selective actuation of the coils, the bearing preloading of the bearing of the shaft is specifically influenceable;

an operating mode of the positioning device for energy regeneration during braking of the rotor; or to exert torque onto the shaft, the coils are excited via the actuation means such that the resulting rotating electromagnetic fields exert circumferential magnetic forces onto the rotor disc that is provided with rotor magnets.

14. The surveying apparatus of claim 11, wherein the surveying apparatus is configured with one of the following:

the coils are arranged on one side of a circuit board and configured such that a back iron is laminated onto the other side of the circuit board;

the coils are arranged on one side of a circuit board and configured such that a back iron is arranged on the other side of the circuit board; or the coils are arranged on one side of a circuit board and configured such that a back iron and the circuit board are components of a composite plate, wherein the composite plate embodies a carrying structure which is fixed to the support or the base in a combination of the materials metal and ceramic and/or plastic, wherein the back iron is optionally configured in a uniformly planar fashion such that no cogging torques exist between stator and rotor when no electric current flows through the coils.

15. The surveying apparatus of claim 11, wherein the surveying apparatus is configured in accordance with one of the following:

to allow the free-hand maneuverability of the beam directing unit or the support, the coils are changed into a non-excited state such that the interaction between the rotor magnets and the coils is canceled, and thus the maneuverability of the rotor disc with respect to the stator is free from magnetic forces; or to restrict the maneuverability of the beam directing unit or of the support, the coils are excited via the actuation means such that the resulting positionally fixed electromagnetic fields exert onto the rotor disc, which is equipped with rotor magnets, circumferential magnetic forces that block the rotation.

16. A surveying apparatus comprising:

an optoelectronic distance measuring device having a measuring beam path, a base for placing the surveying apparatus, a support which is mounted on the base such that it is rotatable about a vertical axis, for azimuthal alignment of the optical beam path, a beam directing unit which is mounted in the support such that it is rotatable about a tilting axis, for elevation alignment of the measurement beam path, an angle measurement system for measuring the axial positions, and an actuatable positioning device driving the beam directing unit or the support, wherein:

the positioning device has a plurality of coils which are arranged in a positionally fixed manner in the form of a ring about the tilting axis and/or vertical axis, with winding axes which are axially parallel to the tilting axis or vertical axis, and the coils are actuatable by actuating means such that they interact with a plurality of rotor magnets which are adjacent circumferentially on a rotor disc with alternating poles and are arranged axially with respect to the coils in order to ensure the following functions:
exerting torque on the beam directing unit or the support,
allowing the free-hand maneuverability of the beam directing unit or the support, and
blocking the maneuverability of the beam directing unit or the support, wherein:

to restrict the maneuverability of the beam directing unit or of the support, the coils are excited via the actuation means such that the resulting positionally fixed electromagnetic fields exert onto the rotor disc, which is equipped with rotor magnets, circumferential magnetic forces that block the rotation.

17. The surveying apparatus of claim 16, wherein the surveying apparatus is configured in accordance with at least one of the following:
the rotor magnets are embodied by a unipartite remanent magnet which is magnetized circumferentially in sectionally alternating fashion;
rotor and/or stator have an axially central opening;
the coils are embodied by conductor tracks which are embedded on the circuit board or by electrical conductors on or in the circuit board;
the rotor disc is connected in a rotationally fixed manner to a shaft, and the shaft is connected in a rotationally fixed manner to the beam directing unit or the support;
the rotor disc is surrounded axially on both sides by in each case a positionally fixed unit and a unit having coils that are arranged in the form of a ring, wherein one of these units is the circuit board and wherein the rotor magnets are situated opposite the coils; or
the positioning device is arranged in the beam directing unit, in the support or in the base.

18. The surveying apparatus of claim 16, wherein the surveying apparatus is configured in accordance with at least one of the following:
using an axial force which is achievable by way of selective actuation of the coils, the bearing preloading of the bearing of the shaft is specifically influenceable;
an operating mode of the positioning device for energy regeneration during braking of the rotor; or
to exert torque onto the shaft, the coils are excited via the actuation means such that the resulting rotating electromagnetic fields exert circumferential magnetic forces onto the rotor disc that is provided with rotor magnets.

19. The surveying apparatus of claim 16, wherein the surveying apparatus is configured with one of the following:
the coils are arranged on one side of a circuit board and configured such that a back iron is laminated onto the other side of the circuit board;
the coils are arranged on one side of a circuit board and configured such that a back iron is arranged on the other side of the circuit board; or
the coils are arranged on one side of a circuit board and configured such that a back iron and the circuit board are components of a composite plate, wherein the composite plate embodies a carrying structure which is fixed to the support or the base in a combination of the materials metal and ceramic and/or plastic,
wherein the back iron is optionally configured in a uniformly planar fashion such that no cogging torques exist between stator and rotor when no electric current flows through the coils.

20. The surveying apparatus of claim 16, wherein the surveying apparatus is configured in accordance with one of the following:
to allow the free-hand maneuverability of the beam directing unit or the support, the coils are changed into a non-excited state such that the interaction between the rotor magnets and the coils is canceled, and thus the maneuverability of the rotor disc with respect to the stator is free from magnetic forces; or
to allow the free-hand maneuverability of the beam directing unit or the support, the coils are excited in a regulated fashion such that, when torque is detected to be exerted by hand onto the beam directing unit or onto the support rotating of the beam directing unit or of the support is permitted, wherein targeted haptic force feedback is directable counter to the rotating by way of the actuation of the coils.

* * * * *